United States Patent
Amberg et al.

(10) Patent No.: US 10,234,702 B2
(45) Date of Patent: Mar. 19, 2019

(54) IN-SITU RING-RESONATOR-MODULATOR CALIBRATION

(71) Applicant: Oracle International Corporation, Redwood Shores, CA (US)

(72) Inventors: Philip Amberg, El Cajon, CA (US); Eric Y. Chang, San Mateo, CA (US); Frankie Y. Liu, Palo Alto, CA (US)

(73) Assignee: Oracle International Corporation, Redwood Shores, CA (US)

( * ) Notice: Subject to any disclaimer, the term of this patent is extended or adjusted under 35 U.S.C. 154(b) by 0 days.

(21) Appl. No.: 15/974,313

(22) Filed: May 8, 2018

(65) Prior Publication Data

US 2018/0259797 A1    Sep. 13, 2018

Related U.S. Application Data

(62) Division of application No. 14/463,654, filed on Aug. 19, 2014, now Pat. No. 9,989,785.

(Continued)

(51) Int. Cl.
*G02F 1/01* (2006.01)
*G02F 1/025* (2006.01)
*G02F 1/313* (2006.01)

(52) U.S. Cl.
CPC ............ *G02F 1/0121* (2013.01); *G02F 1/025* (2013.01); *G02F 1/3132* (2013.01); *G02F 2201/58* (2013.01); *G02F 2203/15* (2013.01)

(58) Field of Classification Search
None
See application file for complete search history.

(56) References Cited

U.S. PATENT DOCUMENTS

| | | | |
|---|---|---|---|
| 4,720,160 A | 1/1988 | Hicks, Jr. | |
| 7,107,848 B2 * | 9/2006 | Turner | G02B 7/181 |
| | | | 73/579 |

(Continued)

OTHER PUBLICATIONS

Liu et al.; "A 10 Gbps, 530 fJ/b optical transceiver circuits in 40 nm CMOS", 2011 Symposium on VLSI Circuits Digest of Technical Papers. 978-4-86348-165-7.

(Continued)

*Primary Examiner* — Chad H Smith
(74) *Attorney, Agent, or Firm* — Park, Vaughan, Fleming & Dowler LLP

(57) ABSTRACT

In an optical device, a ring-resonator modulator, having an adjustable resonance (center) wavelength, receives an optical signal that includes a carrier wavelength from an input-output optical waveguide. Then, a monitoring mechanism monitors a performance metric (such as an average power or a signal swing) of a monitor optical signal from the ring-resonator modulator. Moreover, control logic in the optical device adjusts the resonance wavelength based on the monitored performance metric so that the resonance wavelength is locked to the carrier wavelength. In particular, the control logic may apply a change to an adjustment signal that is provided to the ring-resonator modulator. If the change increases the performance metric, the control logic may continue to modify the resonance wavelength. Otherwise, the control logic may modify the resonance wavelength by applying one or more changes, having an opposite sign to the change, to the adjustment signal.

9 Claims, 8 Drawing Sheets

Related U.S. Application Data

(60) Provisional application No. 61/913,560, filed on Dec. 9, 2013.

(56) References Cited

U.S. PATENT DOCUMENTS

| | | | |
|---|---|---|---|
| 7,327,911 B2* | 2/2008 | Piede | G02F 1/025 |
| | | | 385/129 |
| 7,977,622 B2* | 7/2011 | McLaren | G02B 6/12007 |
| | | | 250/227.11 |
| 2013/0038920 A1* | 2/2013 | Liu | G02F 1/0147 |
| | | | 359/288 |

OTHER PUBLICATIONS

Amberg et al. "A sub-400 fJ/bit thermal tuner for optical resonant ring modulators in 40 nm CMOS", IEEE Asian Solid-State Circuits Conference, Nov. 12-14/Kobe, Japan.

* cited by examiner

IN-SITU RING-RESONATOR-MODULATOR CALIBRATION

CROSS-REFERENCE TO RELATED APPLICATIONS

This application is a divisional application of, and hereby claims priority under 35 U.S.C. § 120 to, pending U.S. patent application Ser. No. 14/463,654, entitled "In-Situ Ring-Resonator-Modulator Calibration," by inventors Philip Amberg, Eric Y. Chang, and Frankie Y. Liu, which was filed on 19 Aug. 2014, the contents of which are incorporated by reference herein. U.S. patent application Ser. No. 14/463,654 itself claims priority under 35 U.S.C. § 119 to U.S. Provisional Patent Application No. 61/913,560, entitled "In-Situ Calibration of an Optical Ring Modulator," by inventors Philip Amberg, Eric Y. Chang, and Frankie Y. Liu, filed Dec. 9, 2013, the contents of which are incorporated by reference herein.

GOVERNMENT LICENSE RIGHTS

This invention was made with United States government support under Agreement No. HR0011-08-9-0001 awarded by DARPA. The United States government has certain rights in the invention.

BACKGROUND

Field

The present disclosure relates to techniques for communicating optical signals. More specifically, the present disclosure relates to wavelength-locking a ring-resonator modulator.

Related Art

Silicon photonics is a promising technology that can provide large communication bandwidth, low latency and low power consumption for inter-chip and intra-chip connections. In the last few years, significant progress has been made in developing low-cost components for use in inter-chip and intra-chip silicon-photonic connections, including: high-bandwidth efficient silicon modulators, low-loss optical waveguides, wavelength-division-multiplexing (WDM) components, and high-speed CMOS optical-waveguide photo-detectors. However, the performance of many of these components is dependent on temperature and/or wavelength changes, which remains an obstacle to implementing silicon-photonic links.

For example, silicon modulators, such as ring-resonator modulators, are used in silicon-photonic links (and in photonic communication in general) to convert electrical signals into modulated optical signals. However, ring-resonator modulators typically work over a very small predefined range of wavelengths. Consequently, variations in the carrier wavelengths of optical signals output from optical sources (such as lasers), as well as changes in the index of refraction of optical waveguides because of fabrication tolerances, temperature fluctuations and/or self-heating of the ring-resonator modulators, can degrade the performance of ring-resonator modulators. In particular, a 1 C temperature change may cause a 110 pm shift in the resonance wavelength of the ring-resonator modulator, which can completely overpower voltage modulation of the ring-resonator modulator.

Hence, what is needed is a ring-resonator modulator without the above-described problems.

SUMMARY

One embodiment of the present disclosure provides an optical device that includes: an input-output optical waveguide that conveys an input optical signal having a carrier wavelength and outputs an output optical signal that includes a resonance wavelength; a ring-resonator modulator having an adjustable resonance wavelength, where the ring-resonator modulator is defined in an optical waveguide; a ring-monitor optical waveguide that conveys a monitor optical signal, having the resonance wavelength, from the ring-resonator modulator; a monitoring mechanism that monitors a performance metric associated with the monitoroptical signal, where the performance metric includes one of: an average optical power associated with the monitor optical signal, and a signal swing of the monitor optical signal; and control logic that adjusts the resonance wavelength based on the monitored performance metric.

In particular, the control logic may: modify the resonance wavelength by applying a change to an adjustment signal that is provided to the ring-resonator modulator; determine an impact on the performance metric of the change in the adjustment signal; if the change increases the performance metric, continue to modify the resonance wavelength by applying a set of changes to the adjustment signal; and otherwise, modify the resonance wavelength by applying another set of changes, having an opposite sign to the change and the set of changes, to the adjustment signal.

Note that the control logic may adjust the resonance wavelength by adjusting a temperature of the ring-resonator modulator. Thus, the optical device may include a heater. Alternatively or additionally, the control logic may adjust the resonance wavelength using carrier injection, carrier depletion and/or carrier accumulation.

In some embodiments, the monitoring mechanism monitors the performance metric and the control logic adjusts the resonance wavelength during a calibration mode. For example, the resonance wavelength may be adjusted after a time interval. Alternatively, the monitoring mechanism may monitor the performance metric and the control logic may adjust the resonance wavelength during normal operation of the optical device. For example, the resonance wavelength may be adjusted continuously.

Furthermore, the control logic may adjust the resonance wavelength to maximize the performance metric using: systematic under-relaxation, averaging of the monitored performance metric, and/or progressively smaller magnitudes of the changes when approaching the maximum.

Another embodiment provides a system that includes the optical device. This system may include: a transmitter that includes the input-output optical waveguide, the ring-resonator modulator and the ring-monitor optical waveguide; an optical link optically coupled to the transmitter; and a receiver that includes the monitoring mechanism and the control logic. The optical link may include a feedback channel. Moreover, via the feedback channel, the receiver may provide adjustment signals to the transmitter to adjust the resonance wavelength of the ring-resonator modulator.

Another embodiment provides a method for locking the resonance wavelength of the ring-resonator modulator to the carrier wavelength of the optical signal, which may be performed by the optical device. During operation, the optical device provides the input optical signal to the ring-resonator modulator, where the input optical signal has the carrier wavelength. Then, the optical device monitors the performance metric associated with a monitor optical signal from the ring-resonator modulator, where the monitor optical signal has the resonance wavelength, and the performance metric includes one of: the average optical power associated with the monitor optical signal, and the signal swing of the monitor optical signal. Next, the optical device adjusts the resonance wavelength based on the performance metric so that the performance metric is optimized.

In particular, the adjusting may involve: modifying the resonance wavelength by applying a change to the adjustment signal that is provided to the ring-resonator modulator; determining the impact on the performance metric of the change in the adjustment signal; if the change increases the performance metric, continuing to modify the resonance wavelength by applying the set of changes to the adjustment signal; and otherwise, modifying the resonance wavelength by applying the other set of changes, having the opposite sign to the change and the set of changes, to the adjustment signal.

BRIEF DESCRIPTION OF THE FIGURES

Note that like reference numerals refer to corresponding parts throughout the drawings. Moreover, multiple instances of the same part are designated by a common prefix separated from an instance number by a dash.

DETAILED DESCRIPTION

Embodiments of an optical device, a system that includes the optical device, and a technique for locking a resonance wavelength of a ring-resonator modulator to a carrier wavelength of an optical signal are described. In the optical device, a ring-resonator modulator, having an adjustable resonance (center) wavelength, receives the optical signal that includes the carrier wavelength from an input-output optical waveguide. Then, a monitoring mechanism monitors a performance metric (such as an average power or a signal swing) of a monitor optical signal from the ring-resonator modulator. Moreover, control logic in the optical device adjusts the resonance wavelength based on the monitored performance metric so that the performance metric is optimized (e.g., the resonance wavelength is locked to the carrier wavelength). In particular, the control logic may apply a change to an adjustment signal that is provided to the ring-resonator modulator. If the change increases the performance metric, the control logic may continue to modify the resonance wavelength by applying a set of changes to the adjustment signal. Otherwise, the control logic may modify the resonance wavelength by applying another set of changes, having an opposite sign to the change and the set of changes, to the adjustment signal.

By wavelength-locking the optical device based on the performance metric, this calibration and control technique may allow the ring-resonator modulator to be tuned. The calibration and control technique may be used for single-channel ring-resonator modulators and/or for multi-channel optical devices. Consequently, multiple, cascaded instances of the optical device may be used. Furthermore, the optical device may facilitate high-speed inter- and intra-chip silicon-photonic interconnects, as well as associated systems that can include the optical device (such as high-performance computing systems).

Figure 1:
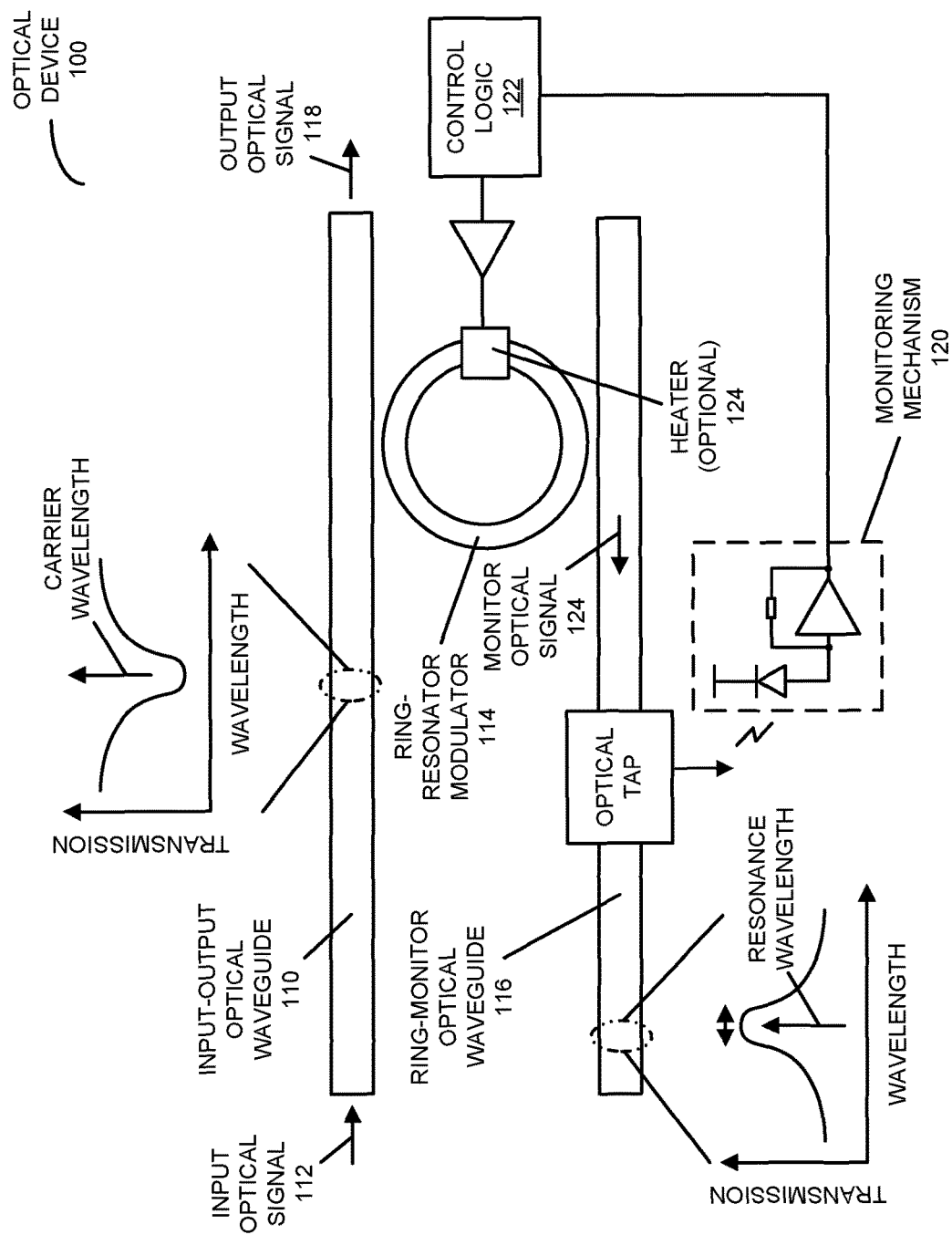
FIG. 1 is a block diagram of an optical device in accordance with an embodiment of the present disclosure.

We now describe embodiments of the optical device. FIG. 1 presents a block diagram of an optical device 100. This optical device includes an input-output optical waveguide 110 that conveys an input optical signal 112 that includes one or more carrier wavelengths ($\lambda_1, \lambda_2, \ldots \lambda_n$), and outputs output optical signal 118 that includes a resonance wavelength ($\lambda_o$), which may be provided to a link terminus. Moreover, optical device 100 includes a ring-resonator modulator 114, having an adjustable resonance wavelength, optically coupled to input-output optical waveguide 110; a ring-monitor optical waveguide 116 that conveys a monitor optical signal 124; and a monitoring mechanism 120, optically coupled to ring-monitor optical waveguide 116, which monitors a performance metric associated with monitor optical signal 124. (Note that optically coupling monitoring mechanism 120 to ring-monitor optical waveguide 116 may allow the performance metric to be determined at the resonance wavelength.) For example, monitoring mechanism 120 may include an optical tap followed by an optical receiver (such as a photodiode) that converts the tapped optical signal into an electrical voltage signal. This electrical voltage signal may represent: an average optical power associated with monitor optical signal 124, and/or a signal swing (or an amplitude) of monitor optical signal 124.

Furthermore, optical device 100 includes control logic 122 that adjusts the resonance wavelength based on the monitored performance metric. In particular, control logic 122 may adjust the resonance wavelength to maximize the amplitude of monitor optical signal 124 (or until the performance metric is in close proximity to the maximum, such as 5% of the maximum). This maximization may be direct (such as by comparing the amplitude of monitor optical signal 124 to a reference value) or indirect (such as based on the average optical power associated with monitor optical signal 124). For example, control logic 122 may: modify the resonance wavelength by applying a change to an adjustment signal that is provided to ring-resonator modulator 114; determine an impact on the performance metric of the change in the adjustment signal; if the change increases the performance metric, continue to modify the resonance wavelength by applying a set of one or more changes to the adjustment signal; and otherwise, modify the resonance wavelength by applying another set of one or more changes, having an opposite sign to the change and the set of changes, to the adjustment signal. Note that the adjustment may be made without monitoring input optical signal 112 on input-output optical waveguide 110 (and, thus, without monitoring the input optical-signal power).

Figure 2:
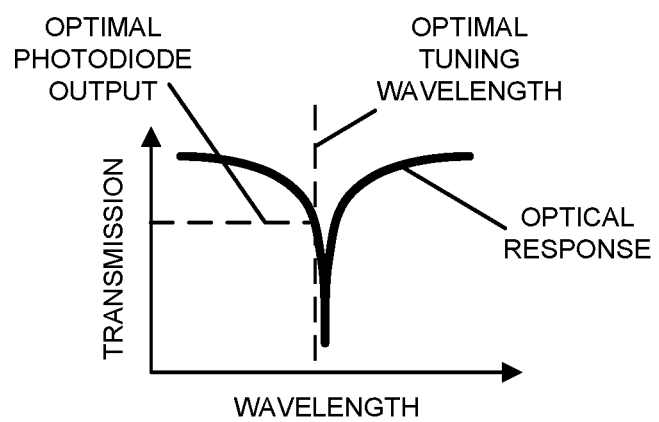
FIG. 2 is a drawing illustrating an optical response of a ring-resonator modulator in the optical device of FIG. 1 in accordance with an embodiment of the present disclosure.

FIG. 2 presents a drawing illustrating an optical response of ring-resonator modulator 114 (FIG. 1). Note that there is a very sharp peak at the resonance wavelength. For optimal operation, the resonance wavelength may be locked at a fixed position relative to the carrier wavelength of input optical signal 112 (FIG. 1). This position may be one that maximizes the amplitude of monitor optical signal 124 in FIG. 1 (which may protect against variations in the output power of an optical source that provides input optical signal 112 in FIG. 1) or the average optical power of monitor optical signal 124 in FIG. 1. In another embodiment, the resonance position may minimize loss through the ring-resonator modulator 114 (FIG. 1).

Referring back to FIG. 1, ring-resonator modulator 114 may be characterized by its: quality (Q) factor, bandwidth, coupling wavelength to input-output optical waveguide 110 and ring-monitor optical waveguide 116, and/or free-spectral range (or, equivalently, its size, such as the radius of ring-resonator modulator 114). (Note that a small ring-resonator modulator has a large free-spectral range, and a large ring-resonator modulator has a small free-spectral range.) Furthermore, ring-resonator modulator 114 may be critically or optimally coupled to input-output optical waveguide 110 and ring-monitor optical waveguide 116 so that, at the resonance of ring-resonator modulator 114 (as well as possibly at its integer multiples or harmonics), there is maximal transfer of energy from one component to the next in optical device 100 with or without reduced reflections, such as the energy transfer from input-output optical waveguide 110 to ring-resonator modulator 114, etc. Note that the Q factor may determine the bandwidth of the modulation associated with ring-resonator modulator 114. In addition, the Q factor of ring-resonator modulator 114 is a function of the optical coupling between input-output optical waveguide 110 and ring-resonator modulator 114, the optical coupling between ring-monitor optical waveguide 116 and ring-resonator modulator 114, and the optical loss in ring-resonator modulator 114.

In some embodiments, ring-resonator modulator 114 has a high quality (Q) factor (such as 15,000), as well as narrow bandwidth and/or free-spectral range so that it can modulate an optical signal at the resonance wavelength. For example, ring-resonator modulator 114 may have a radius between 5-10 µm and a free-spectral range between 8-20 nm.

In an exemplary embodiment, ring-resonator modulator 114 (and/or set of ring-resonator modulators) is tuned because of effects such as carrier-wavelength variations in an optical source that provides input optical signal 112, temperature changes and manufacturing tolerances that result in large variations in the resonance wavelengths across a wafer (or integrated circuit) and/or between wafers. In particular, control logic 122 may adjust the resonance wavelength to lock the resonance wavelength and the carrier wavelength of input optical signal 112. For example, a photodiode in monitoring mechanism 120 may measure the amount of light in ring-resonator modulator 114. This measurement may indicate the current state of the optical response of ring-resonator modulator 114. During an initial calibration procedure, control logic 122 may average the photodiode output over a period of time while optical signals corresponding to 1s are received, and then may average the photodiode output over the period of time while optical signals corresponding to 0s are received. Then, control logic 122 may use the difference of the measured average levels to maximize the performance metric (e.g., to maximize the signal swing of monitor optical signal 124 or the average optical power of monitor optical signal 124), and may store the difference as a predetermined reference value. Subsequently, during normal operation control logic 122 may compare the average photodiode output associated with a data stream to the predetermined reference value (such as the previous measurement of the difference of the average photodiode outputs), and may adjust a heater to keep the average photodiode output equal to the predetermined reference value (and, thus, may maintain the maximum value of the performance metric). Note that control logic 122 may adjust the resonance wavelength to maximize the performance metric using: systematic under-relaxation, averaging of the monitored performance metric, and/or progressively smaller magnitudes of the changes when approaching the maximum. These approaches may be used to limit the size of changes to the resonance wavelength during adjustments.

In some embodiments, control logic 122 adjusts the resonance wavelength by adjusting a temperature of ring-resonator modulator 114 based on the performance metric. For example, optical device 100 may include an optional heater 124 (such as a silicon resistor integrated on the ring-resonator optical waveguide or a metal heater) thermally coupled to ring-resonator modulator 114, which may result in a wavelength change of 100 pm/C. More generally, optical device 100 may include a phase tuner that locks the resonance wavelength of ring-resonator modulator 114 with the carrier wavelength of optical signal 112, thereby optimizing the performance metric while optically coupling an optical signal between input-output optical waveguide 110 and ring-monitor optical waveguide 116. In this way, the resonance wavelength of ring-resonator modulator 114 can be tuned even in the presence of thermal noise, temperature changes and thermal cross-talk.

While thermal tuning is illustrated in FIG. 1, in other embodiments electrical tuning (such as carrier injection, carrier depletion and/or carrier accumulation) is used, for example, a p-i-n tuner. In general, thermal tuning may be used because electrical tuning may spoil the Q factor of ring-resonator modulator 114 by adding additional loss into the ring-resonator waveguide(s). However, thermal tuning may result in increased power consumption.

In some embodiments, monitoring mechanism 120 monitors the performance metric and control logic 122 adjusts the resonance wavelength during a calibration mode. For example, the resonance wavelength may be adjusted: periodically, after a time interval, and/or as needed based on the performance metric. During each instance of the calibration mode, the stored reference value may be updated. Alternatively, monitoring mechanism 120 may monitor the performance metric and control logic 122 may adjust the resonance wavelength during normal operation of optical device 100. For example, the resonance wavelength may be adjusted continuously. This may involve the use of a high-bandwidth transimpedance amplifier (TIA) in monitoring mechanism 120 (such as one with a data rate of 10 Gb/s).

In an exemplary embodiment, an in-situ calibration technique (without external inputs or manual entries provided by an operator) is used by control logic 122 to determine the reference value and to optimize the performance metric in the presence of subsequent variations (such as temperature variations). This calibration technique leverages the convex relationship (with a global and local maximum) of the performance metric as a function of the adjustment signal (such as the heater current) to ring-resonator modulator 114. The calibration technique may climb this curve starting near the origin until the maximum of the performance metric (at a finite value of the adjustment signal) is obtained. For purposes of illustration, in the discussion that follows the adjustment signal is a heater current and the performance metric is the signal swing of monitor optical signal 124.

During the calibration technique, a heater in or proximate to ring-resonator modulator 114 is set to its lowest heating value. Then, a constant logical '1' is transmitted by a transmitter and the resulting optical signal level is stored, and a constant logical '0' is transmitted by the transmitter and the resulting optical signal level is stored. Note that during the calibration technique, the transmitter may transmit at a low data rate (such as 100 Mb/s or 1 Gb/s) instead of 10 Gb/s. Next, the signal swing is computed based on the difference of the stored optical signal levels. Moreover, the current signal swing is compared to the previously measured signal swing (i.e., the predetermined reference value). If the current signal swing is greater than the previously measured signal swing, the heater current is incremented and the aforementioned operations are repeated (the logical 1s and logical 0s are transmitted again, the optical signal levels are stored, the signal swing is computed, etc.). Alternatively, if the current signal swing is less than the previously measured signal swing, the heater current is decremented and the optical signal levels for the 1s and 0s are averaged and stored for subsequent use as the predetermined reference value.

Note that the calibration technique may be performed quickly. In particular, because the thermal time constant of ring-resonator modulator 114 may be around 1 ms, the calibration technique may involve 100 ns of 1s being transmitted, followed by 100 ns of 0s being transmitted. Moreover, the 1s and the 0s may be transmitted as continuous blocks of data, or these blocks may be broken into sub-blocks that are interleaved between normal data patterns.

Furthermore, during normal operation, real data is transmitted by the transmitter. The average optical signal level is compared to the predetermined reference value. If the measured optical signal level is greater than the predetermined reference value, the heater current is increased. Otherwise, the heater current is decreased.

Figure 3:
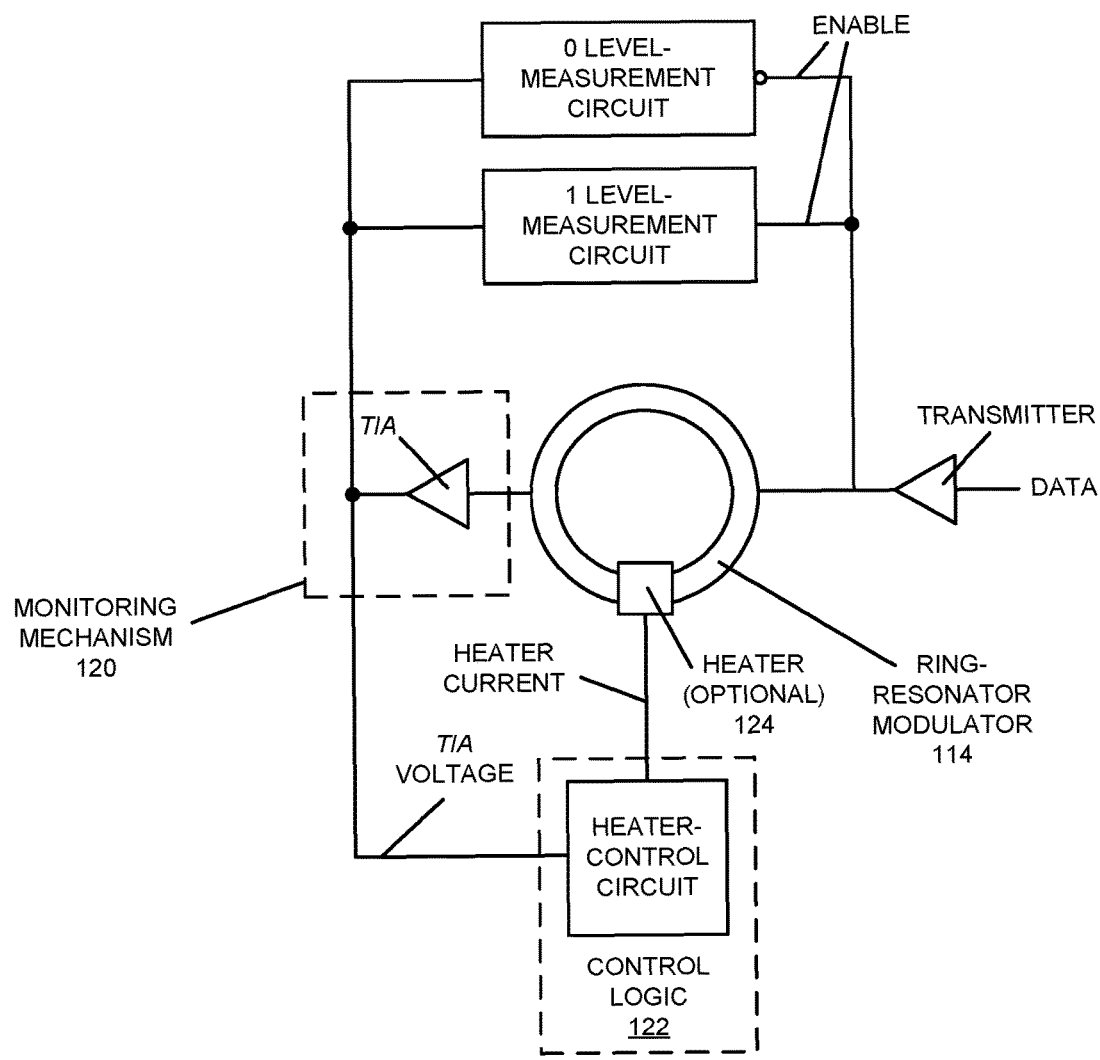
FIG. 3 is a block diagram illustrating calibration of the ring-resonator modulator in the optical device of FIG. 1 in accordance with an embodiment of the present disclosure.

FIG. 3 presents a block diagram illustrating calibration of ring-resonator modulator 114 in optical device 100 (FIG. 1). In particular, during the calibration technique, the 'level-1' optical signal level (i.e., when the transmitter transmits 1s) and the 'level-0' optical signal level (i.e., when the transmitter transmits 0s) are selectively stored and used by control logic 122 to determine the predetermined reference value.

Figure 4:
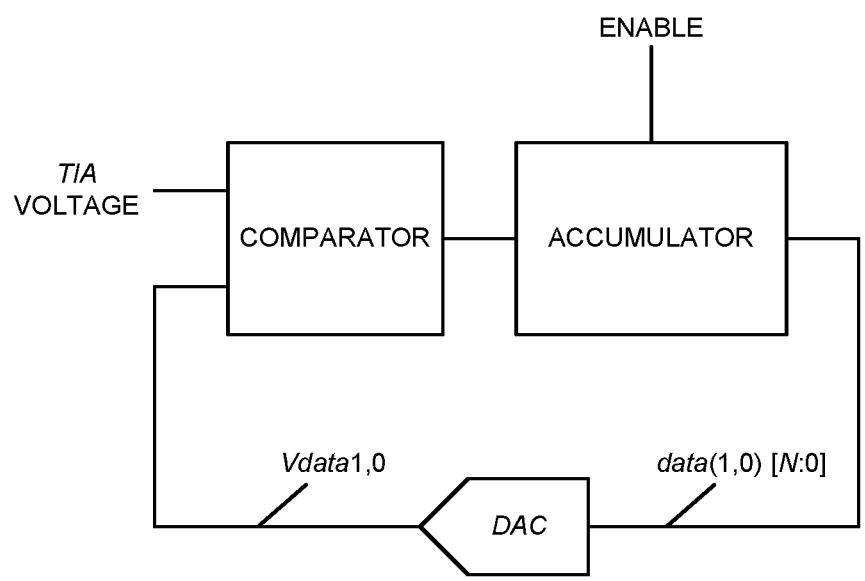
FIG. 4 is a block diagram illustrating a level-measurement circuit in the optical device of FIG. 1 in accordance with an embodiment of the present disclosure.

FIG. 4 presents a block diagram illustrating a level-measurement circuit in optical device 100 (FIG. 1). Instances of this level-measurement circuit may be used to measure the level-1 optical signal level and the level-0 optical signal level (respectively). When control logic 122 provides an enable signal (such as when the transmitter is transmitting 1s or 0s), the output from the TIA (such as the TIA voltage) in monitoring mechanism 120 may be compared to a voltage (output by a digital-to-analog converter or DAC) corresponding to a 1 (or a 0). The level-measurement circuit may attempt to drive $V_{data}$ to equal the output from the TIA.

Because of circuit mismatches, the comparator in the level-measurement circuit may have an offset. To address this, in some embodiments, after determining the maximum value of the signal swing, the transmitter transmits a '1010' data pattern so that a correction for the offset may be determined and applied to the DAC.

Figure 5:
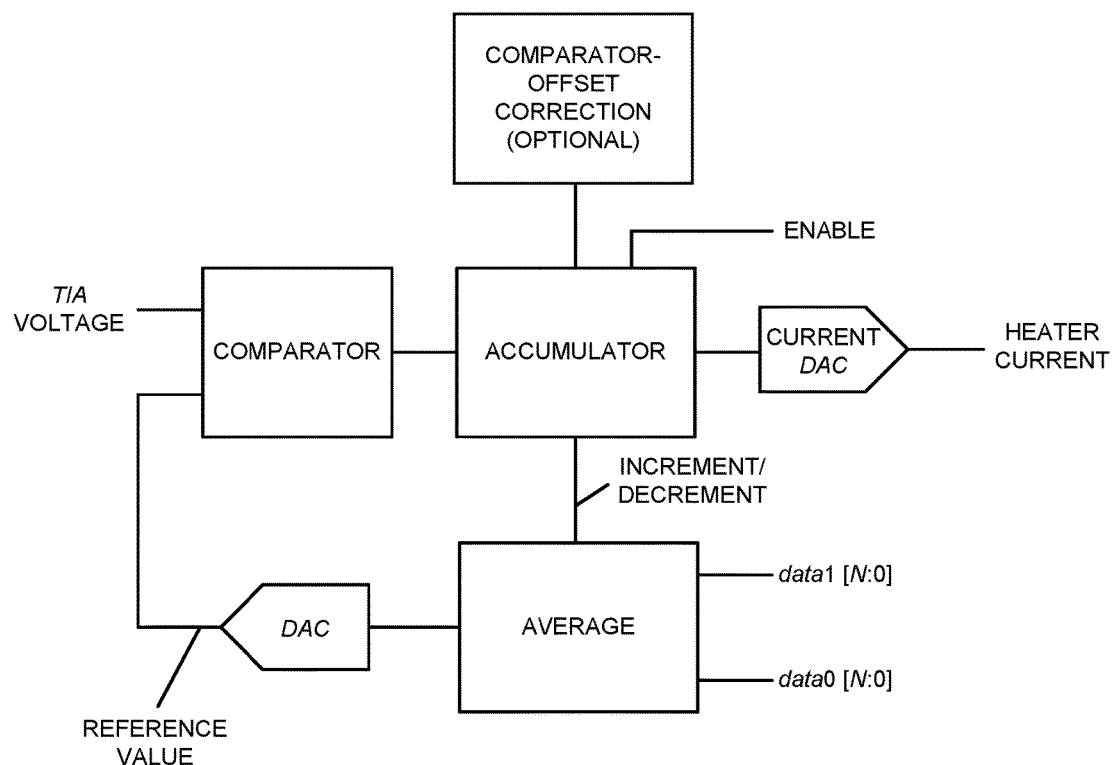
FIG. 5 is a block diagram illustrating a heater-control circuit in the optical device of FIG. 1 in accordance with an embodiment of the present disclosure.

FIG. 5 presents a block diagram illustrating a heater-control circuit in optical device 100 (FIG. 1). During the calibration technique the accumulator in the heater-control circuit is set to zero and the increment path from the comparator is disabled. Then, the data signal is set to logic 1. This enables the 1 level-measurement circuit. This level-measurement circuit adjusts Vdata1 until it is equal to the TIA voltage. Note that Vdata1 may dither around the TIA voltage with a step size equal to the DAC step size.

Next, the data signal is set to logic 0. This enables the 0 level-measurement circuit. This-level measurement circuit adjusts Vdata0 until it is equal to the TIA voltage. Note that Vdata0 may also dither around the TIA voltage with a step size equal to the DAC step size.

After these measurements, the accumulators in each level-measurement circuit hold an N-bit digital representation of the 1 and 0 optical signal levels. These optical signal levels are used to compute the optical signal swing (which is the difference of the optical signal levels).

If the current signal swing is greater than the previously measured signal swing, the heater current is incremented and the current signal swing is stored as the new previous signal swing. Because the dependence of the signal swing on the heater current is convex, when the measured signal swing becomes less than the previous signal swing, the global maximum has been reached. Therefore, when the current signal swing is less than the previously measured signal swing, the heater current is decremented and the heater current will dither around the point of maximum signal swing.

Once the value of the heater current that maximizes the signal swing is determined, it is stored in the accumulator. Then, the data1 and data0 signals represent the maximum signal swing.

Next, data1 and data0 are averaged to determine the reference value. This is the reference value that the heater-control circuit drives the TIA voltage to using the heater. This completes the calibration technique during the calibration mode.

Subsequently, during normal operation, the accumulator in the heater-control circuit takes its increment signal from the comparator rather than the peak-detect circuit. Moreover, the level-measurement circuits may also be disabled during normal operation, and real data is also sent on the data signal. This data may be DC-balanced so that the output of the low bandwidth TIA represents the true average.

The comparator compares the TIA voltage, which represents the average optical signal level, with the predetermined reference value. Based on the comparator output, the heater current may be incremented or decremented with the accumulator to bring the TIA voltage closer to the predetermined reference value.

In some embodiments, the heater-control circuit includes an optional comparator-offset correction. Comparator offsets may cause the stored optical signal levels to deviate from the actual optical signal levels. This may result in errors in the determined reference value because the average of the two optical signal levels does not represent the true average. Therefore, in some embodiments after the signal swing is maximized, a '1010' clock data is transmitted by the transmitter to produce the average signal level at the output of the TIA. Circuits that may be identical to the level-measurement circuits may then be used with the comparator in the heater-control circuit to drive the reference value to the TIA voltage. This reference value is then saved and represents the true average data level and is free of the offsets associated with the comparators in the level-measurement circuits.

Furthermore, in some embodiments the 1 and 0 optical signal levels are measured quickly to reduce the effect of data-dependent self-heating. In particular, sending 1s or 0s may heat the ring-resonator modulator based on the data level. The thermal mass of the ring-resonator modulator may then average the heating from 1s and 0s with a certain time constant. If too many 1s or 0s are sent consecutively, the averaged data-dependent heating may deviate from the nominal case, which assumes a DC-balanced data signal. In order to address this self-heating problem during the calibration technique, the time spent in each data state may be long enough for the low-bandwidth TIA to resolve the data level, but faster than the thermal time constant of the ring-resonator modulator to avoid impacting the average data-dependent heating. In these embodiments, the maximizing of the performance metric (such as the optical signal swing) may be performed slowly (on a time scale of the thermal time constant of the ring-resonator modulator) to allow the thermal mass of the ring-resonator modulator to settle in response to the heater signal.

Alternatively or additionally, in some embodiments a high-bandwidth TIA is used at the transmitter. This may allow the 1 and 0 optical signal levels to be measured continuously. Instead of performing the determination of an ideal reference value when an optical link is turned on, in these embodiments the optical signal swing is maximized continuously during normal operation. Furthermore, instead of comparing the average optical signal level to an ideal reference value and then adjusting the heater current, the heater current may be adjusted directly in response to the measured optical signal level.

Figure 7:
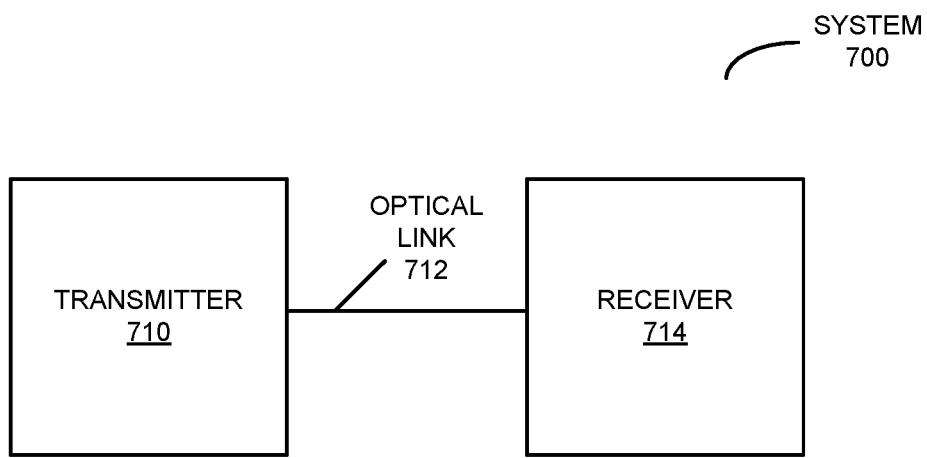
FIG. 7 is a block diagram illustrating a system that includes the optical device of FIG. 1 in accordance with an embodiment of the present disclosure.

As described further below with reference to FIG. 7, in some embodiments a feedback channel is used from the receiver at the terminus of the optical link. This feedback channel may be a low-bandwidth electrical link or it may piggyback on the existing optical link. Moreover, the feedback channel may send information about the received optical signal swing from the high-speed receiver (including the high-bandwidth TIA) back to the transmitter, which may adjust the heater current in response to this information.

While the preceding discussion illustrated the calibration technique with a performance metric, in some embodiments the performance metric adapted or changed dynamically. For example, control logic 122 (FIGS. 1 and 3) may switch between maximizing the signal swim minimizing the average optical power during the calibration technique.

Figure 6:
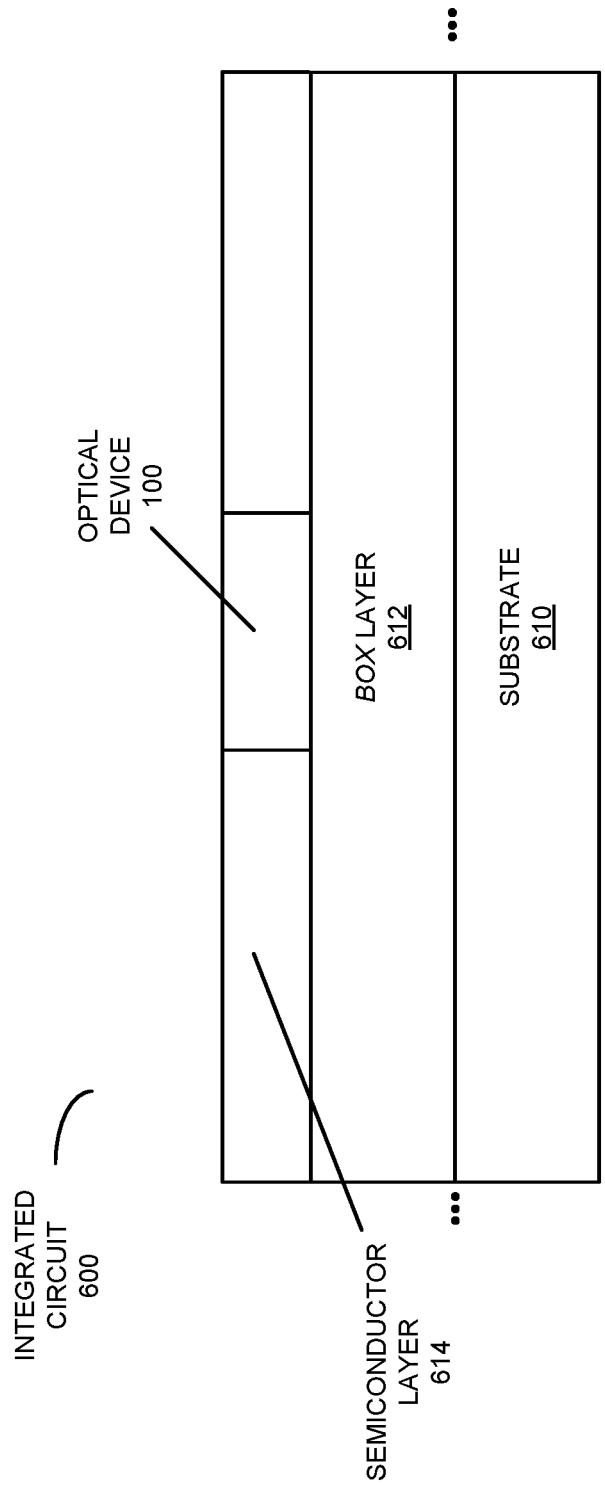
FIG. 6 is a block diagram illustrating a side view of an integrated circuit that includes the optical device of FIG. 1 in accordance with an embodiment of the present disclosure.

In some embodiments, optical device 100 (FIG. 1) is disposed on an integrated circuit. This is shown in FIG. 6, which presents a block diagram illustrating an integrated circuit 600. In this integrated circuit, portions of optical device 100 (including input-output optical waveguide 110, ring-monitor optical waveguide 116 and ring-resonator modulator 114 in FIG. 1) may be defined in a semiconductor layer 614. Furthermore, integrated circuit 600 may include a substrate 610 and a buried-oxide (BOX) layer 612 deposited on substrate 610, where semiconductor layer 614 is disposed on buried-oxide layer 612.

Note that substrate 610 may include silicon, buried-oxide layer 612 may include a dielectric or an oxide (such as silicon dioxide), and/or semiconductor layer 614 may include silicon (thus, input-output optical waveguide 110 and ring-monitor optical waveguide 116 may include silicon optical waveguides). Therefore, substrate 610, buried-oxide layer 612 and semiconductor layer 614 may constitute a silicon-on-insulator (SOI) technology. In some embodiments, the silicon in semiconductor layer 614 is 0.5 μm thick, and the silicon-dioxide layer may have a thickness between 0.1 and 10 μm.

Note that in some embodiments, such as FIG. 6, the light is confined in semiconductor layer 614 and may be surrounded on all sides (including below) by an oxide. However, in other embodiments a waveguide ring or a waveguide modulator may be fabricated using a different confinement, such as a polymer ring deposited on an oxide, or polysilicon surrounded by an oxide (in which case buried-oxide layer 612 may not be needed).

One or more of the preceding embodiments of the optical device may be included in a system and/or an electronic device. This is illustrated in FIG. 7, which presents a block diagram illustrating a system 700 that includes the optical device.

In some embodiments, system 700 includes: a transmitter 710 that includes the input-output optical waveguide, the ring-resonator modulator and the ring-monitor optical waveguide; an optical link 712 optically coupled to transmitter 710; and a receiver 714 that includes the monitoring mechanism and the control logic. Optical link 712 may include a feedback channel. Moreover, via the feedback channel, receiver 714 may provide feedback signals to transmitter 710 to adjust the resonance wavelength of the ring-resonator modulator. Thus, optical link 712 may be capable of bidirectional communication, and the optical device in the preceding embodiments may be distributed between transmitter 710 and receiver 714 in system 700. Note that if the monitoring mechanism is implemented in receiver 714, this may require or entail the use of a high-bandwidth transimpedance amplifier in the monitoring mechanism (such as one with a data rate of 10 Gb/s).

The optical device may be used in a variety of applications, including: VLSI circuits, communication systems (such as WDM), storage area networks, data centers, networks (such as local area networks), and/or computer systems (such as multiple-core processor computer systems). Note that system 700 may include, but is not limited to: a server, a laptop computer, a communication device or system, a personal computer, a work station, a mainframe computer, a blade, an enterprise computer, a data center, a portable-computing device, a supercomputer, a network-attached-storage (NAS) system, a storage-area-network (SAN) system, and/or another electronic computing device. Moreover, note that a given computer system may be at one location or may be distributed over multiple, geographically dispersed locations.

Optical device 100 (FIG. 1), integrated circuit 600 (FIG. 6) and/or system 700 may include fewer components or additional components. For example, semiconductor layer 614 (FIG. 6) may include polysilicon or amorphous silicon. In addition, monitoring mechanism 120 (FIG. 1) may be optically coupled to ring-resonator modulator 114 (FIG. 1) instead of ring-monitor optical waveguide 116 (FIG. 1). Furthermore, a wide variety of fabrication techniques may be used to fabricate the optical device in the preceding embodiments, as is known to one of skill in the art. In addition, a wide variety of optical components may be used in or in conjunction with the optical device (such as alternative optical modulators that replace ring-resonator modulator 114 in FIG. 1).

Although these embodiments are illustrated as having a number of discrete items, the embodiments of the optical device, the integrated circuit and the system are intended to be functional descriptions of the various features that may be present rather than structural schematics of the embodiments described herein. Consequently, in these embodiments two or more components may be combined into a single component, and/or a position of one or more components may be changed.

Figure 8:
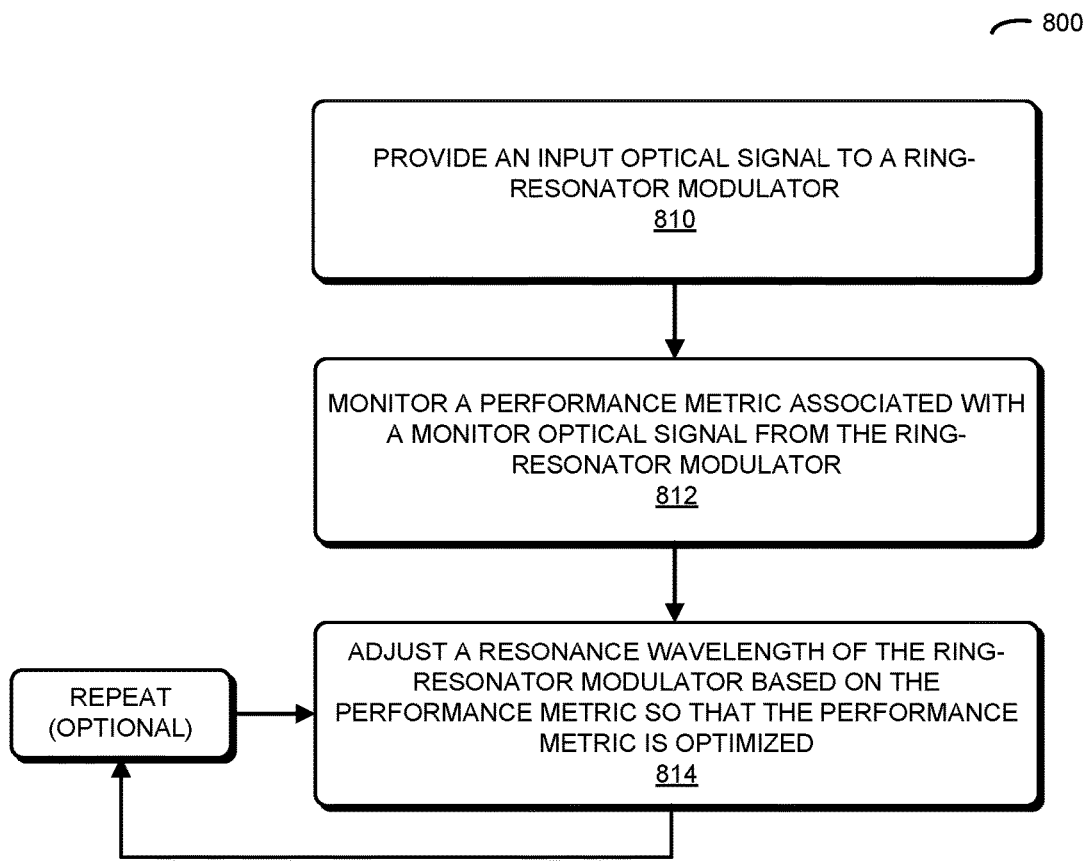
FIG. 8 is a flow chart illustrating a method for locking a resonance wavelength of a ring-resonator modulator to a carrier wavelength of an optical signal in accordance with an embodiment of the present disclosure.

We now describe embodiments of the method. FIG. 8 presents a flow chart illustrating a method 800 for locking a resonance wavelength of a ring-resonator modulator to a carrier wavelength of an optical signal, which may be performed by an optical device (such as optical device 100 in FIG. 1). During operation, the optical device provides an input optical signal to the ring-resonator modulator (operation 810), where the input optical signal has the carrier wavelength. Then, the optical device monitors a performance metric associated with a monitor optical signal from the ring-resonator modulator (operation 812), where the monitor optical signal has the resonance wavelength, and the performance metric includes one of: an average optical power associated with the monitor optical signal, and a signal swing of the monitor optical signal.

Next, the optical device adjusts the resonance wavelength based on the performance metric so that the performance metric is optimized (operation 814). In particular, the adjusting may involve: modifying the resonance wavelength by applying a change to the adjustment signal that is provided to the ring-resonator modulator; determining the impact on the performance metric of the change in the adjustment signal; if the change increases the performance metric, continuing to modify the resonance wavelength by applying the set of changes to the adjustment signal; and otherwise, modifying the resonance wavelength by applying the other set of changes, having the opposite sign to the change and the set of changes, to the adjustment signal. Thus, in method 800, operations 812 and 814 may be optionally repeated multiple times.

In some embodiments of method 800, there may be additional or fewer operations. Moreover, the order of the operations may be changed, and/or two or more operations may be combined into a single operation.

Note that the calibration and control technique may be used to tune a ring-resonator modulator for de-multiplexing WDM optical signals at a receiver.

While the preceding embodiments illustrate the use of the optical device in conjunction with an optical link, the optical device may be used in applications other than communications, such as: manufacturing (cutting or welding), a lithographic process, data storage (such as an optical-storage device or system), medicine (such as a diagnostic technique or surgery), a barcode scanner, entertainment (a laser light show), and/or metrology (such as precision measurements of distance).

In the preceding description, we refer to 'some embodiments.' Note that 'some embodiments' describes a subset of all of the possible embodiments, but does not always specify the same subset of embodiments.

The foregoing description is intended to enable any person skilled in the art to make and use the disclosure, and is provided in the context of a particular application and its requirements. Moreover, the foregoing descriptions of embodiments of the present disclosure have been presented for purposes of illustration and description only. They are not intended to be exhaustive or to limit the present disclosure to the forms disclosed. Accordingly, many modifications and variations will be apparent to practitioners skilled in the art, and the general principles defined herein may be applied to other embodiments and applications without departing from the spirit and scope of the present disclosure. Additionally, the discussion of the preceding embodiments is not intended to limit the present disclosure. Thus, the present disclosure is not intended to be limited to the embodiments shown, but is to be accorded the widest scope consistent with the principles and features disclosed herein.

What is claimed is:

1. A method for locking a resonance wavelength of a ring-resonator modulator to a carrier wavelength of an optical signal, wherein the method comprises:
   providing an input optical signal to the ring-resonator modulator, wherein the input optical signal has the carrier wavelength;
   monitoring a performance metric associated with a monitor optical signal from the ring-resonator modulator, wherein the monitor optical signal has the resonance wavelength, and wherein the performance metric includes an optical power associated with the monitor optical signal, and a signal swing of the monitor optical signal; and
   adjusting the resonance wavelength based on the performance metric, wherein the adjusting involves:
   modifying the resonance wavelength by applying a change to an adjustment signal that is provided to the ring-resonator modulator, wherein the adjustment signals includes a heater current;
   determining an impact on the performance metric of the change in the adjustment signal;
   if the change increases the performance metric, continuing to modify the resonance wavelength by applying a set of changes to the adjustment signal, wherein the adjustment signal is increased by progressively smaller magnitudes as the adjustment signal approaches a maximum value, and wherein the modifications to the resonance wavelength are performed on a time scale of a thermal mass of the ring-resonator modulator such that the modifications are performed slow enough to allow the thermal mass of the ring-resonator modulator to settle in response to the adjustment signal; and
   otherwise, modifying the resonance wavelength by applying another set of changes, having an opposite sign to the change and the set of changes, to the adjustment signal.

2. The method of claim 1, wherein adjusting the resonance wavelength comprises adjusting a temperature of the ring-resonator modulator.

3. The method of claim 2, adjusting the temperature of the ring-resonator modulator comprises adjusting a heater, which is thermally coupled to the ring-resonator modulator.

4. The method of claim 1, wherein adjusting the resonance wavelength involves adjusting the resonance wavelength using one of: carrier injection, carrier depletion and/or carrier accumulation.

5. The method of claim 1, wherein monitoring the performance metric and adjusting the resonance wavelength involves monitoring the performance metric and adjusting the resonance wavelength during a calibration mode.

6. The method of claim 5, wherein the resonance wavelength is adjusted after a time interval.

7. The method of claim 1, wherein monitoring the performance metric and adjusting the resonance wavelength involves monitoring the performance metric and adjusting the resonance wavelength during normal operation of the ring-resonator module.

8. The method of claim 7, wherein the resonance wavelength is adjusted continuously.

9. The method of claim 1, wherein adjusting the resonance wavelength involves adjusting the resonance wavelength to maximize the performance metric using one of: systematic under-relaxation, averaging of the monitored performance metric, and progressively smaller magnitudes of the changes when approaching the maximum value.

\* \* \* \* \*

UNITED STATES PATENT AND TRADEMARK OFFICE
CERTIFICATE OF CORRECTION

PATENT NO. : 10,234,702 B2
APPLICATION NO. : 15/974313
DATED : March 19, 2019
INVENTOR(S) : Amberg et al.

Page 1 of 1

It is certified that error appears in the above-identified patent and that said Letters Patent is hereby corrected as shown below:

In the Specification

In Column 1, Line 63, delete "1 C" and insert -- 1° C --, therefor.

In Column 5, Line 63, delete "is" and insert -- 1s --, therefor.

In Column 9, Line 47, delete "swim" and insert -- swing or --, therefor.

Signed and Sealed this
Twenty-fifth Day of February, 2020

Andrei Iancu
*Director of the United States Patent and Trademark Office*